US012205327B2

(12) United States Patent
Bussard et al.

(10) Patent No.: US 12,205,327 B2
(45) Date of Patent: Jan. 21, 2025

(54) ADAPTIVE ALIGNMENT SYSTEM

(71) Applicant: L3Harris Technologies, Inc., Melbourne, FL (US)

(72) Inventors: Paul Emerson Bussard, Santa Rosa, CA (US); Scott John Taylor, Healdsburg, CA (US); Scott Brian McMillan, Windsor, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 396 days.

(21) Appl. No.: 17/564,766

(22) Filed: Dec. 29, 2021

(65) Prior Publication Data
US 2023/0206495 A1 Jun. 29, 2023

(51) Int. Cl.
*G06T 7/80* (2017.01)
*G06T 7/11* (2017.01)
*G06T 7/215* (2017.01)
*G06T 7/38* (2017.01)

(52) U.S. Cl.
CPC .............. *G06T 7/80* (2017.01); *G06T 7/11* (2017.01); *G06T 7/215* (2017.01); *G06T 7/38* (2017.01); *G06T 2207/20004* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 5,987,164 A * | 11/1999 | Szeliski | ............... | G06V 10/147 382/284 |
| 10,911,677 B1* | 2/2021 | Zhou | ..................... | H04N 23/90 |
| 2008/0267453 A1* | 10/2008 | Avrahami | ............... | G06T 7/246 382/103 |
| 2010/0118160 A1* | 5/2010 | Tsurumi | ............... | H04N 23/698 348/231.2 |
| 2013/0235272 A1* | 9/2013 | Kimiyama | ........... | H04N 5/2624 348/578 |
| 2019/0219392 A1 | 7/2019 | Everson et al. | | |
| 2020/0160560 A1* | 5/2020 | Besley | ................. | H04N 23/683 |
| 2020/0333162 A1* | 10/2020 | Wang | ................... | G06T 1/0014 |
| 2020/0349723 A1 | 11/2020 | Geva et al. | | |

(Continued)

OTHER PUBLICATIONS

Matsushita, Yasuyuki, et al. "Full-frame video stabilization with motion inpainting." IEEE Transactions on pattern analysis and Machine Intelligence 28.7 (2006): 1150-1163. (Year: 2006).*

*Primary Examiner* — Michelle M Entezari Hausmann
(74) *Attorney, Agent, or Firm* — Condo Roccia Koptiw LLP

(57) ABSTRACT

A device, system, and/or method may be used to provide an adaptive alignment. A first video data may be received. The first video data may comprise a first video frame and a second video frame. Sensor pose data may be determined. The pose data may be associated with the first video frame and the second video frame. An adjusted video frame may be determined based on the first video frame and a motion indicated by the pose data. A frame adjustment value may be determined by comparing a first pixel from the adjusted video frame to a second pixel from the second video frame. The frame adjustment value may correlate the pose data to the first video data. A second video data may be determined by applying the frame adjustment value.

15 Claims, 8 Drawing Sheets

(56) References Cited

U.S. PATENT DOCUMENTS

| | | | |
|---|---|---|---|
| 2020/0357141 A1 | 11/2020 | Zhou et al. | |
| 2021/0116553 A1 | 4/2021 | Walls et al. | |
| 2021/0157316 A1* | 5/2021 | Liu | G01C 21/3804 |
| 2021/0256766 A1* | 8/2021 | Muhlethaler | G06F 3/012 |
| 2022/0028092 A1* | 1/2022 | Bleyer | G06T 7/337 |
| 2023/0281841 A1* | 9/2023 | Soper | A61B 34/35 382/128 |

* cited by examiner

ADAPTIVE ALIGNMENT SYSTEM

BACKGROUND

A sensor, such as an Infrared Search and Track (IRST) sensor, may be used to identify threats that may illuminate as a single pixel of a focal plane array sensor. Sensor systems may identify threats to be located in geospatial coordinates. And these sensors systems may be shipboard, airborne, and/or land borne. These sensors systems may also include an Inertial Measurement Unit (IMU), which may be mounted relative to the IRST sensor. And a correlation between the IMU, geospatial coordinates, and one or more pixels of the focal plane array sensors may be determined. However, the alignment between IMU data and the sensor data (e.g., video data, a video frame, etc.) may not be accurate if the alignment is not calibrated.

SUMMARY

Systems, methods, and instrumentalities providing an adaptive alignment are disclosed herein. The adaptive alignment may improve alignment between data from an Inertial Measurement Unit (IMU) and data from another sensors, such as an Infrared Search and Track (IRST), a video camera sensor, a light detection and ranging (LIDAR) sensor, and/or the like.

A device, system, and/or method may be used to provide an adaptive alignment. A first video data may be received. The first video data may comprise a first video frame and a second video frame. Inertia measurement unit (IMU) data may be determined. The IMU data may be associated with the first video frame and the second video frame. An adjusted video frame may be determined based on the first video frame and a motion indicated by the IMU data. A frame adjustment value may be determined by comparing a first pixel from the adjusted video frame to a second pixel from the second video frame. The frame adjustment value may correlate the IMU data to the first video data. A second video data may be determined by applying the frame adjustment value to the first video data if the frame adjustment value satisfies a criteria. The second video data may be sent.

Systems, methods, and instrumentalities providing an adaptive alignment are disclosed herein. A first sensor data may be received. The first sensor data may comprise a first frame and a second frame. Inertia measurement unit (IMU) data may be received. The IMU data may be associated with the first and second sensor data. A first value associated with a first adjusted frame may be determined. The first value may be based on a comparison of a first pixel from the first adjusted frame to a second pixel from a second frame. A second value associated with a second adjusted frame may be determined. The second value may be based on a comparison of a third pixel from the second adjusted frame to the second pixel from the second frame. A second sensor data may be sent if the first value indicates an improved alignment between the IMU data and the first adjusted frame when compared to the second value. The second sensor data may comprise the first adjusted frame.

DETAILED DESCRIPTION

Figure 1:
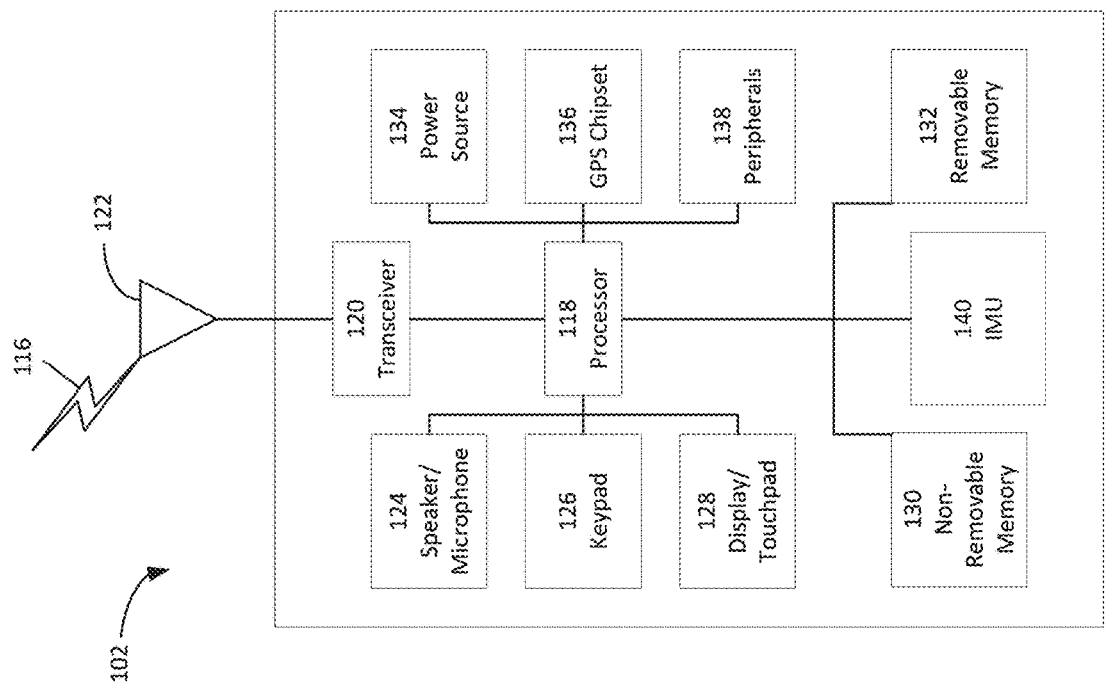
FIG. 1 is a system diagram illustrating an example device that may be used to provide an adaptive alignment.

A detailed description of illustrative embodiments will now be described with reference to the Figures. Although this description provides a detailed example of possible implementations, it should be noted that the details are intended to be exemplary and in no way limit the scope of the application.

An image processing may need calibration of a parameter. For example, an image processing may require a boresight alignment calibration. In examples, a boresight alignment may be between an inertial measurement unit (IMU) and a sensor. A sensor may demonstrate 0.6 pixel measurement repeatability for a central line of sight (LOS) position. A focal length collimator (e.g., a short focal length collimator) may be used to collect video and/or IMU data, e.g., while the sensor is rotated in roll. A system, such as an adaptive alignment system, may perform image post processing, e.g., over 717×717 pixels. The system may perform a boresight alignment for a factory calibration of one or more imaging sensors. The system may be used or mounted on a platform, e.g., during an operation. A platform may be one or more of shipboard, airborne, land environments, and/or the like. Dynamic misalignment may be caused by environmental changes and/or after replacing an IMU or image sensor. The adaptive alignment system may perform dynamic and/or periodic correction of the dynamic misalignment, e.g., during deployment.

An image processing may need calibration of a parameter. For example, an image processing may request a boresight alignment calibration. In examples, a boresight alignment may be between an inertial measurement unit (IMU) and a sensor. A sensor may demonstrate 0.6 pixel measurement repeatability for a central line of sight (LOS) position. A focal length collimator (e.g., a short focal length collimator) may be used to collect video and/or pose data, which may be IMU data, e.g., while the sensor is rotated in roll. A system, such as an adaptive alignment system, may perform image post processing, e.g., over 717×717 pixels. The system may perform a boresight alignment for a factory calibration of one or more imaging sensors. The system may be used or mounted on a platform, e.g., during an operation. A platform may be one or more of shipboard, airborne, land environments, and/or the like. Dynamic misalignment may be caused by environmental changes and/or after replacing an IMU or image sensor. The adaptive alignment system may perform dynamic and/or periodic correction of the dynamic misalignment, e.g., during deployment.

An infrared search and track (IRST) sensor may identify a threat. The IRST may illuminate a pixel of a focal plane array sensor. A system, such as an adaptive alignment system with an optical system, may identify a threat located in a geospatial coordinate, e.g., with an accuracy better than 1 milliradian. The system may be mounted in a platform. As described herein, the platform may be or may include a shipboard, airborne, and/or land-based platform. The system may include an inertial measurement unit (IMU) mounted relative to the IRST sensor(s). The IRST sensor may provide an alignment between the IMU and a geospatial coordinate(s). For example, the IRST sensor may provide an alignment with accuracy<0.5 milliradians, e.g., working with an inertial navigation system (INS). The system may map every pixel relative to the IMU reference frame and may need one or more of alignment parameter information. Examples of the alignment parameter information may be or include a latency parameter (e.g., time coordination between image and IMU), a sensor focal length parameter, an image rotation parameter (e.g., alignment of the image vertical pixels to the IMU vertical plane), an image boresight parameter (e.g., alignment of the image horizontal and vertical offset to agree with the IMU pointing reference), or a distortion parameter (e.g., variation of effective focal length across the sensor field of view).

A one-time characterization of the alignment parameters may not be sufficient to maintain a desired accuracy. For example, the alignment parameters may be affected by dynamic effects caused by one or more of thermal variations, shock events, or other environmental, or aging effects. Monitoring and dynamically adjusting one or more alignment parameters may be achieved by a system described herein, e.g., during a normal operation of an IRST system and/or a metric sensor system.

A device, such as an adaptive alignment system described herein, may establish an angular relationship between a pixel of an image and an IMU. The adaptive alignment system may process (e.g., register and re-register) the image by re-registering image frames. The adaptive alignment system may re-register the image frames based on pose data, which may be IMU data. For example, the adaptive alignment system may receive pose data from the IMU. The pose data may indicate an attitude change based on a sensor reading. The adaptive alignment system may select an alignment parameter(s) and may adjust the selected alignment parameter of interest(s), e.g., to find the best parameter value. For example, the adaptive alignment system may adjust the alignment parameter based on a score by comparing the frames. The scoring may be based on a large number of relevant pixels, such as by frame-to-frame subtraction. Such scoring may not use fiducials and/or spatial frequency content in a scene associated with the image.

In an example, pose data may include any effects which may correlate to a static scene's motion, as observed by the sensor. When the scene is composed of distant features, sensor attitude data, such as available from an IMU, may be sufficient. In examples where the translation of the sensor or the scene may produce observed motion (e.g., significant observed motion), pose data may include translation data in addition to attitude data. In an example, such as a lab environment, the sensor may be fixed while the scene is translated or rotated in a manner that may enable accurate pose data. When the sensor is translating and the scene contains objects at a variety of ranges, the pose data may account for optical flow to represent the motion of image pixels. Those pose data may account for attitude and translation data. Optical flow may characterize the effect of near features changing position in the image faster than distant features. Such pose data may be used to apply adaptive alignment for a sensor mounted to a vehicle traveling forward while viewing near and far scene elements. Pose data may predict a shift of one or more sensor (e.g., all sensor) observations used for adaptive alignment from frame to frame, when one or more sensor (e.g., all sensor) alignment parameters may be at their optimum setting.

The adaptive alignment system may use different types of sensor angular changes based on the alignment parameter of interest. For example, the adaptive alignment system may use sensor rotation about a point near the center of the image for boresight alignment. The adaptive alignment system may use rotation information for a boresight alignment. The adaptive alignment system may utilize compound motions, such as horizontal and/or vertical slew accompanied by an image rotation. The adaptive alignment may use the compound motion based on low fidelity actuation of sensor pointing direction.

The adaptive alignment system may use a correlation between pixel motions and IMU indicated motion. For example, scenes with moving features may not correlate to the IMU motion. The features may be substantially closer than at infinity focus, objects may move in the scene, or noise(s) may interfere with the alignment system. The adaptive alignment system may dynamically determine such features. For example, the adaptive alignment system may detect a moving target to identify one or more features that contribute noise. The adaptive alignment system may exclude the features when scoring the quality of re-registered images.

The adaptive alignment system may use a number of methods to determine one or more features that may contribute noise. For example, there may be pixels in the scene that may move differently than indicated by the pose data. The adaptive alignment system may determine that the motion indicated by the pixels may not correlated to the pose data. An IRST system may have a capability to detect moving targets, and, in an example, this capability may be used by the adaptive alignment system to identify the moving targets and may exclude one or more pixels related to the moving targets from a scoring process. By removing the one or more pixels related to the moving targets, the adaptive alignment system may be able to reduce noise and/or determine one or more features that may contribute to noise.

In an example, a motion region (e.g., a significant motion region) may be cropped from a measurement. The motion region may be a region containing a water surface with waves, a portion of the sky with clouds, and/or the like. In an example, a remaining scene motion (e.g., a minor remaining scene motion) may be allowed to remain as the remaining scene motion may impact a few pixels and/or may cause an insignificant error relative to the abundance of other pixels used for the measurement. The remaining scene motion may be a motion, such as a bird, a vehicle, and/or the like. Thus, the minor error caused by the bird can be treated as part of the random noise of the measurement.

Pixels in the scene that move differently than indicated by the IMU corrupt the measurement. IRST systems have the capability to detect moving targets, so this capability may be used to identify such regions and exclude those pixels from the scoring process. A significant motion region might be cropped from the measurement, such as a region containing a water surface with waves. Minor remaining scene motion, such as a bird that only impacts a few pixels, causes an insignificant error relative to the abundance of other pixels used for the measurement. Thus, the minor error caused by the bird may be treated as part of the random noise of the measurement.

The adaptive alignment system may include an optical system. The optical system may include an inertial navigation system and a camera. An inertial navigation system may determine a center that the camera is pointing. The inertial navigation system may determine a distortion between an image from the camera and an alignment between the center that the camera is pointing.

As described herein, the adaptive alignment system may include a camera mounted in a platform. The adaptive alignment system may adjust one or more alignment parameters, e.g., to accurately determine a pixel location relative to geospace. The alignment parameter may be or include a latency parameter (e.g., timing difference of information from the IMU), a sensor focal length parameter (e.g., changes in a magnification), an image rotation parameter (e.g., twist of the camera and/or roll or changes in where the system is pointing the camera), an image boresight parameter (e.g., determining whether the middle of the image aligns with the middle of the image that the IMU determines to be), or a distortion parameter (e.g., images from a fisheye camera).

The camera from the system may be mounted on a platform and may be referred to as a gimbal or a turret. The camera may be mounted in a platform, such as an airplane, a ship, etc. The adaptive alignment system may include a modular camera. The system may use a modular camera to repair or replace the mounted camera. The adaptive alignment system may use a modular camera and may realign the system.

A modular camera may contain a lens and camera system that may be mounted to each other that may be easily removed from the system as a sub assembly. When a replacement is installed, several alignment parameters relative to the system may be different. In an example, measurements may be used to establish the new alignment parameters. Adaptive alignment may make many of the required measurements.

FIG. 1 is a system diagram illustrating an example device that may be used to provide an adaptive alignment. For example, FIG. 1 is a system diagram illustrating an example device 102. As shown in FIG. 1, the device 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, inertial measurement unit (IMU) 140, and/or other peripherals 138, among others. It will be appreciated that the device 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the device 102 to operate in a wired and/or wireless environment. The processor 118 may be coupled to the transceiver 120, which may be coupled to the transmit/receive element 122. In an example, the processor 118 and the transceiver 120 may be as separate components (e.g., transceiver 120 may be external to device 102). In an example, the processor 118 and the transceiver 120 may be integrated together in an electronic package or chip.

The transmit/receive element 122 may be configured to transmit signals to, or receive signals over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

The processor 118 of the device 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the device 102, such as on a server or a home computer (not shown).

The processor 118 may receive power from the power source 134 and may be configured to distribute and/or control the power to the other components in the device 102. The power source 134 may be any suitable device for powering the device 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the device 102. In addition to, or in lieu of, the information from the GPS chipset 136, the device 102 may receive location information over the air interface 116 from a network and/or determine its location based on the timing of the signals being received. It will be appreciated that the device 102 may acquire location information by way of any suitable location-determination method while remaining consistent with an embodiment.

The processor 118 may be coupled to IMU 140. IMU 140 may be a device and/or a module that measures and reports a body's specific force, angular rate, orientation of the body, and/or the like. IMU 140 may be used to maneuver aircraft (e.g., an attitude and heading reference system), unmanned aerial vehicles (UAVs), spacecraft, satellites, landers, ships, submarines, and/or the like. IMU 140 may include a GPS receiver. For example, IMU 140 may allow a GPS receiver to work when GPS-signals may be unavailable, such as in tunnels, inside buildings, or when electronic interference may be present. In an example, IMU 140 may communicate with GPS chipset 136.

In an example, the processor 118 may be coupled to a GPS (e.g., 136) and an IMU (e.g., 140). The processor 118 may use data provided by the IMU along with data from the GPS to provide a correction for earth rotation effects, which may be confused with scene motion. Earth rotation effects may depend on look direction and latitude. In an example, an Inertial Navigation Solution may be provided by the processor 118 using the GPS receiver and the IMU to determine a sensor latitude and look direction.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a hands free headset, a Bluetooth® module, a frequency modulated (FM) radio unit, a media player, a Virtual Reality and/or Augmented Reality (VR/AR) device, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

Figure 2:
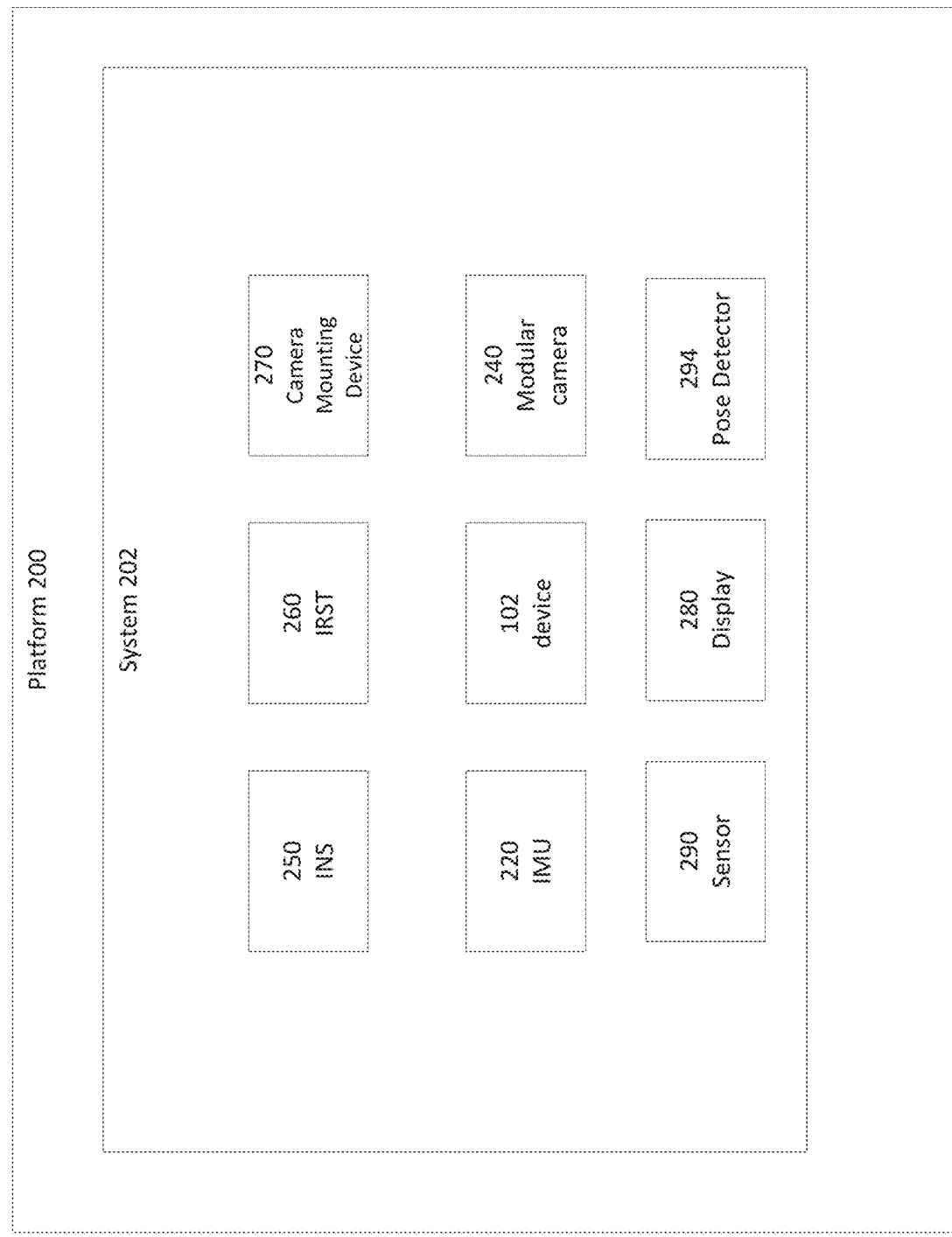
FIG. 2 is a system diagram illustrating an example platform and/or system that may use a device that provides an adaptive alignment.

FIG. 2 is a system diagram illustrating an example platform and/or system that may use a device that provides an adaptive alignment. As shown in FIG. 2, platform 200 may include system 202, which may include device 102. Device 102 may provide platform 200 with adaptive alignment of sensor data and/or pose data as described herein. Although device 102 may be described in FIG. 2 with respect to system 202 and platform 200, in some embodiments, device 102 may be a standalone device.

Platform 200 may be a fixed platform or a mobile platform. Platform 200 may be sea based, air based, space based, and/or land based. Platform 200 may be a structure, vehicle, and/or mechanism. For example, platform 200 may be a ship, an aircraft, a satellite, a tank, a car, a helicopter, a building, a missile silo, and/or the like. Platform 200 may be a weapons platform for a missile, a bomb, a gun, an energy weapon, and/or the like. Platform 200 may be a sensor platform for radar, infrared, video, LIDAR, and/or the like. Platform 200 may include one or more systems, such as system 202. For example, Platform 200 may include system 202, as shown with respect to FIG. 2. In another example, Platform 200 may include one or more systems, such as interface system 300, sensor system 310, and/or computing system 320 shown with respect to FIG. 3.

Referring again to FIG. 2, system 202 may be a sensor system and/or a weapons systems. In an example, system 202 may be structured around a gun, such as a gun turret on a ship, or bracing on an aircraft. In an example, system 202 may be structured for radar sensors, infrared sensors, video sensors, LIDAR sensors, and/or the like.

System 202 may include a number of components and/or modules. For example, system 202 may include inertial navigation system (INS) 250, infrared search and tracking (IRST) 260, camera mounting device 270, inertial measurement unit (IMU) 220, device 102, modular camera 240, display 280, and/or sensor 290.

INS 250 may be a device and/or a module that may use motion sensors (e.g., accelerometers), and/or rotation sensors (e.g., gyroscopes) to calculate a position. For example, INS 250 may calculate by dead reckoning the position, the orientation, and/or the velocity (e.g., direction and speed of movement) of a moving object (e.g., a ship). This may be done, for example, without a use of an external reference. INS 250 may include a barometric altimeter, a magnetic sensors (e.g., magnetometers), and/or speed measuring devices.

IRST 260 may be a device and/or a module that may be used for detecting and/or tracking objects that may give off infrared radiation (e.g., such as an infrared signature). For example, IRST 260 may be used to track objects such as jet aircraft and/or helicopters. IRST 260 may be an active or a passive (e.g., does not give out radiation of its own).

IMU 220 may be a device and/or a module that measures and reports a body's specific force, angular rate, orientation of the body, and/or the like. INS 250 may include one or more of an accelerometer, a gyroscope, and a magnetometer. IMU 220 may be used to maneuver aircraft (e.g., an attitude and heading reference system), unmanned aerial vehicles (UAVs), spacecraft, satellites, landers, ships, submarines, and/or the like. IMU 220 may include a GPS receiver. For example, IMU 220 may allow a GPS receiver to work when GPS-signals may be unavailable, such as in tunnels, inside buildings, or when electronic interference may be present.

Camera mounting device 270 may be or may interface with a device such as modular camera 240 and/or sensor 290. Camera mounting device 270 may move and/or control modular camera 240 and/or sensor 290. For example, camera mounting device 270 may be a gimbal that modular camera 240 and/or sensor 290 may be mounted to. Camera mounting device 270 may be a pivoted support that permits rotation of a modular camera 240 and/or sensor 290 about an axis. In an example, camera mounting device 270 may include a set of three gimbals, one mounted on the other with orthogonal pivot axes, that may be used to allow a camera and/or a sensor mounted on the innermost gimbal to remain independent of the rotation of its support. For example, camera mounting device 270 may be used on a ship to keep modular camera 240 and/or sensor 290 upright with respect to the horizon despite the ship's pitching and rolling.

Modular camera 240 may be a device and/or module for making a video and/or an image. Modular camera 240 may comprise an image sensor that may detect and convey information used to make an image. For example, modular camera 240 may comprise a sensor that may convert the variable attenuation of light waves into signals. In an example, the sensor may process waves that may be light or other electromagnetic radiation.

Modular camera 240 may comprise a charge-coupled device (CCD) and/or an active-pixel sensor (CMOS sensor). Both CCD and CMOS sensors may be based on metal-oxide-semiconductor (MOS) technology, with CCDs based on MOS capacitors and CMOS sensors based on MOSFET (MOS field-effect transistor) amplifiers.

Display 280 may be a device and/or a module for presentation of information in a visual form. For example, display 280 may be a display that shows data from modular camera 240 (e.g., images and/or video) and/or sensor 290 (e.g., radar, LIDAR, etc.).

In an example, the output of system 202 may be data that may be used to further imaging processing. For example, system 202 may provide scene feature detection that may be used by another application, system, and/or device. In an example, system 202 may provide feature detection that may be used by an IRST for target detection.

Sensor 290 may be a device and/or a module for receiving a signal. In an example, sensor 290 may receive a signal from one or more directions. The signal may correspond and/or be associated to a pixel. The signal may be a single frequency, may be within a signal that may be comprised of a range of frequencies, and/or the like. The signal may be an acoustic signal, such as may be used underwater; may be an audio signal; may be a radio frequency (RF); may be a microwave signal; may be an infrared signal; may be a visible light signal; may be an X-ray signal; may be a cosmic ray signal; a combination thereof; and/or the like.

Sensor 290 may be a sonar sensor, directional microphone, directional RF antenna, a radar, an IR camera, an image sensor, an IR sensor, an IR camera, a camera, a computed tomography (CT) x-ray scanner, and/or the like.

Sensor 290 may be an array of sensors. The array of sensors may include one or more sensors, such as sensor 290. The array of sensors may generate a number of pixels using one or more sensors. The array of sensors may be a matrix array that may comprise one or more digital cameras. The array of sensors may be a line array, such as a scanned line detector (e.g., a CMOS line scan image sensor). The array of sensors may comprise a detector that may be used to scan over a plurality of directions. The array of sensors may comprise a one or more observation points that may be located at different locations or positions on earth or in space (e.g., astronomical telescopes).

Pose Detector 294 may be a device that may determine where a sensor, such as sensor 290, may be pointing. Pose Detector 294 may determine where the sensor is pointing or directed towards independently of any signal received by the sensor. Pose Detector 294 may associate data from an Inertial Measurement Unit (IMU), such as IMU 220, with data from a sensor, such as Sensor 290. Pose Detector 294 may comprise one or more position encoders that may indicate a relative orientation between a sensor and a scene, such as between a camera and collimator that may be interconnected by an optics table. Pose Detector 294 may comprise a plumb bob, bubble level indicators, or magnetometer to indicate sensor pose relative to earth scenes. Pose Detector 294 may determine astronomical observations, time, Lat/Long/Altitude location and/or the like to indicate a position and look direction of a sensor.

FIG. 2 illustrates an example adaptive alignment system may include a video sensor and an IMU. For example, the adaptive alignment system may include video sensor and an IMU rigidly mounted onto a platform. The platform may include a ship, an automobile, a vessel, an airplane, and/or the like.

The adaptive alignment system may perform video recording of raw video, e.g., with time synchronization capability to the corresponding pose data at video frame rate (e.g., and/or or at a faster rate).

The adaptive alignment system may be capable of replaying video with appropriate corrections (e.g., non-uniformity correction (NUC), automatic gain and level control (AGLC), etc.) for adaptive alignment processing.

The adaptive alignment system may slew and/or rotate the LOS. The adaptive alignment system may slew and/or rotate manually and need not be particularly smooth motion.

The adaptive alignment system may use relevant scene filling. For example, the relevant scene filling may use less than 10% of field of view (FOV). The relevant scene filling may be a collimator, an outdoor scene, etc. The adaptive alignment system may work with motion angles (e.g., small motion angles that are ~1 mrad). The adaptive alignment system may enable calibration during operation for LOS co-boresight (horizontal, vertical, and/or roll).

The adaptive alignment system may have factory calibration set-up. For example, the adaptive alignment system may have a sensor(s) mounted to a platform and/or a system by mechanical tolerances to assure FOV overlap. The adaptive alignment system may not need mechanical adjustments.

The adaptive alignment system may move FOV. For example, a 3-axis gimbal may enable commanded motion about any axis direction. The 3-axis gimbal may enable motion appropriate for nominal look direction of a sensor. The adaptive alignment system may manually move FOV.

The adaptive alignment system may perform alignment for one or more latency, sensor focal length, image rotation, image boresight, or distortion parameters.

The adaptive alignment system may store factory values in a sensor for latency, focal length, distortion, and/or co-boresight.

The adaptive alignment system may perform field calibration set-up. For example, the adaptive alignment system may be installed on a vehicle.

The adaptive alignment system may adjust calibration for a distant scene (e.g., >100 yd) for each sensor. For example, the adaptive alignment system may crop out any pixels viewing the vehicle.

The adaptive alignment system may work while the vehicle is under way. For example, the adaptive alignment system may crop out high motion regions in near FOV.

A 3-axis gimbal may enable commanded motion about any axis direction which enables motion appropriate for nominal look direction for a sensor.

Fixed-mount installations may use vehicle motion to provide motion stimulus.

The adaptive alignment system may store values of latency, focal length, and/or distortion parameter. The stored values of latency, focal length, and/or distortion parameter may be stable over long periods. Boresight parameters may likely drift.

The adaptive alignment system may determine measurement repeatability for each calibration type. For example, the adaptive alignment system may perform repeated measurement for IMU accuracy if the IMU noise level is above a threshold level (e.g., in the 1 urad region).

The adaptive alignment system may perform repeatability of calibration as a function of range of motion utilized (e.g., roll range for co-boresight, or etc.). The adaptive alignment system may perform repeatability of calibration based on scene characteristics. The adaptive alignment system may perform repeatability of calibration based on spatial frequency content. The adaptive alignment system may perform repeatability of calibration based on contrast (e.g., fog, haze, etc.). The adaptive alignment system may perform repeatability of calibration based on foreground motion. The adaptive alignment system may perform repeatability of calibration based on a minor object motion (e.g., birds, distant ships, cars in a shore scene, etc.). The adaptive alignment system may perform repeatability of calibration based on sea state (e.g., white caps, waves, sun glints, etc.). The adaptive alignment system may perform repeatability of calibration based on daytime vs. nighttime. The adaptive alignment system may be able to receive and/or process one or more signals. A signal in the one or more signals may comprise a waveband and/or a combination of wave bands. For example, the adaptive alignment system may be able to receive and/or process a visible signal, a mid-wave infrared (MWIR) signal, a longwave IR (LWIR), a combination thereof, and/or the like. The adaptive alignment system may be able to receive and/or process the one or more signals simultaneously.

The adaptive alignment system may provide a method for adaptive alignment, which may be referred to as a correlation process. For example, the adaptive alignment system may assist in finding the value of an alignment parameter that may provide an alignment between sensor system data and computing system data, such as between a sensor data and pose data.

In an example, the adaptive alignment system may find a value for an alignment by correlating pose changes to pixel detection changes. A pose may be an indication of a direction that a sensor may be facing. The correlation process performed by the adaptive alignment system may vary the alignment parameter of interest over a range of values to find a plurality of scores. The scores may produce a pattern. The pattern of scores may be used to find the accurate value (e.g., a most accurate value) for an alignment parameter by selection of the scores (e.g., the best scores) or interpolation between one or more scores (e.g., nearly the best scores). In examples where several alignment parameters may be found using the adaptive alignment method, iteration may be used as improvement of the accuracy of one alignment parameter may enable further improvement of another alignment parameter. In an example, after one or more alignment parameters are determined, the location of origin for signals of interest may be calculated. A corrected frame may be generated which may include one or more pixels (e.g., may contain all pixels). A corrected frame may be generated which may include a correction of a subset of pixels where the subset of pixels may suffice when they are near a target of interest. In an example, an adaptive alignment may be applied to a sparse array of earth based astronomical observatories. As the earth rotates and orbits the sun the pose of an observatory (e.g., each observatory) may change. The adaptive alignment system may measure the distortion of an observatory (e.g., each observatory) as well as the distortion in a composite containing pixels from one or more observatories.

Figure 3:
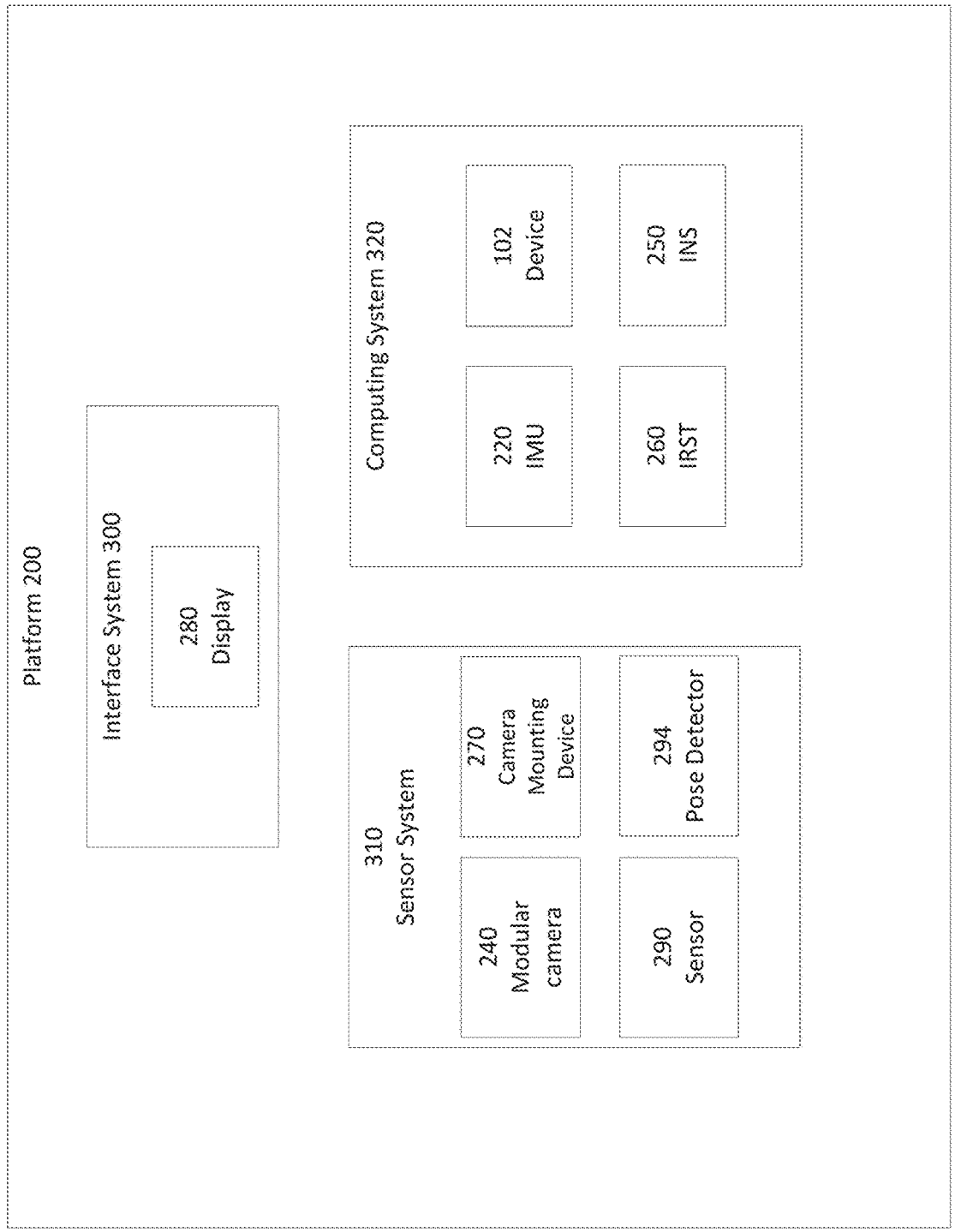
FIG. 3 is a system diagram illustrating an example platform and/or system that may use a device that provides an adaptive alignment.

FIG. 3 is a system diagram illustrating an example platform and/or system that may use a device that provides an adaptive alignment. As shown in FIG. 3, Platform 200 may include one or more systems (e.g., subsystems), such as interface system 300, sensor system 310, and/or computing system 320 shown with respect to FIG. 3. Interface system 300 may include one or more interface devices and/or modules that may be used by a user to interface with data generated by computing systems 320. For example, Interface system 300 may include display 280.

Computing system 320 may include one or more devices and/or modules that may be used to process data from sensor system 310. For example, computing system 320 may receive data from sensor system 310, may process the data, and may provide the resulting output to interface system 300.

Sensor system 310 may include one or more devices and/or modules that may be used for sensing an environment around platform 200. For example, sensor system 310 may detect objects around platform 200, a location of platform 200, a speed of platform 200, a threat to platform 200, and/or the like. Sensor system 310 may provide sensing data to computing system 320 and/or interface system 300.

A device may perform an adaptive alignment. For example, an adaptive alignment system may perform an adaptive alignment. Adaptive alignment performance may be demonstrated with a pod and a sensor. For example, adaptive alignment performance may be demonstrated using a pod and a 1280×1024 sensor in long-wave infrared (LWIR) at 60 Hz frame rate, 480 urad instantaneous field of view (IFOV), and 35° horizontal FOV with −9% distortion. An inertial measurement unit (IMU) may be used for adaptive alignment. For example, an LN-200 IMU may be accompanied with a pod and/or sensor and may provide data, e.g., at 3600 Hz. The LN-200 IMU may record data in synchronism with the 60 Hz frame rate. In an adaptive alignment system, a sensor and an IMU may be mounted. For example, a sensor and an IMU may be rigidly mounted to a pod (e.g., with no gimbal). The sensor and the IMU mounted to the pod may operate a fixture (e.g., manually operated fixtures) to induce motions needed for alignment. Similar image processing described herein may apply to one or more of latency, LOS horizontal, vertical, roll, or focal length for a full set of alignments.

A process for an IMU to sensor line of sight (LOS) co-boresight, horizontal and vertical may use one or more of the following.

Figure 4:
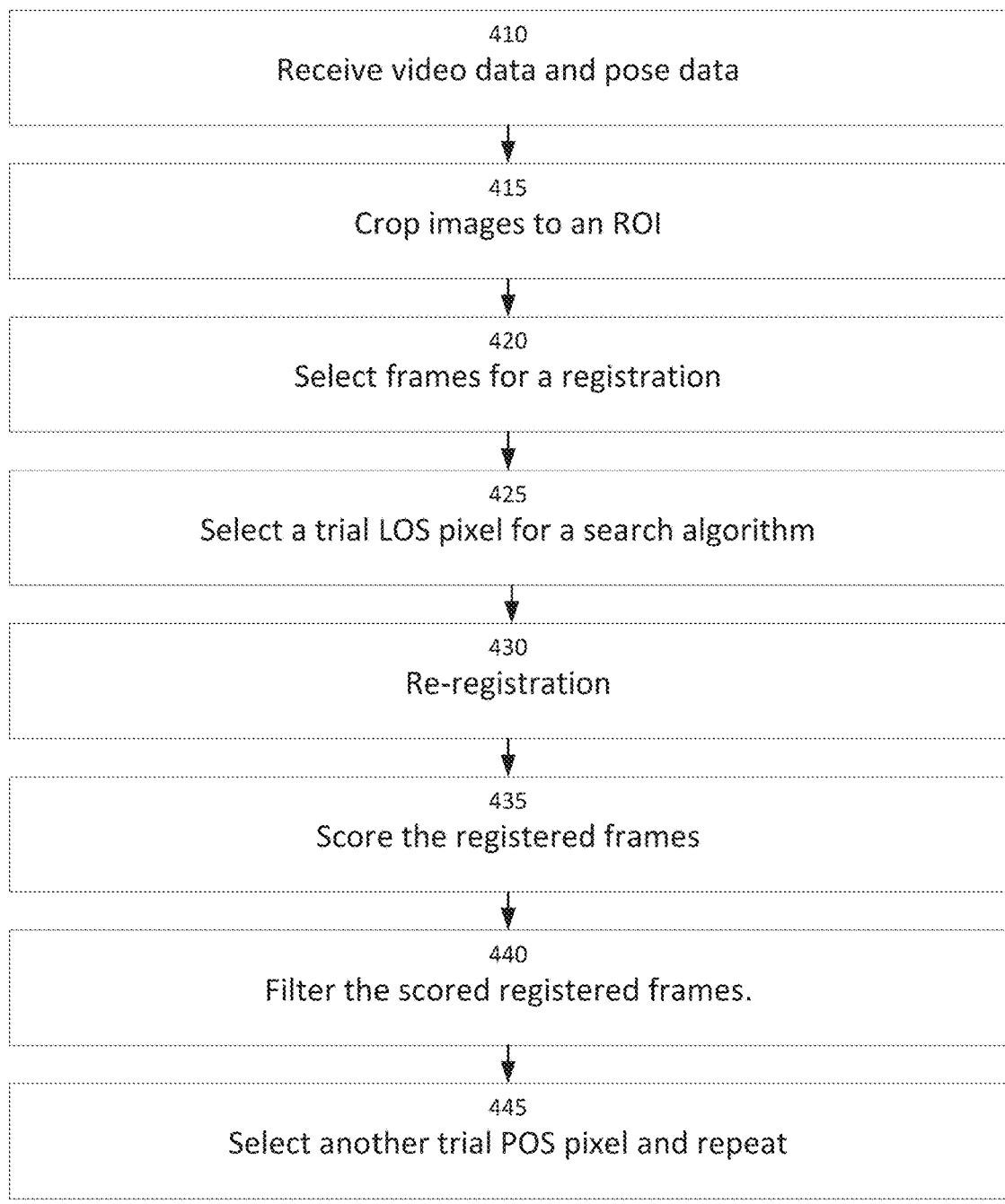
FIG. 4 illustrates an example method performed by a device to provide an adaptive alignment for image processing.

FIG. 4 illustrates an example of a device performing an adaptive alignment for image processing. As described herein, a device, such as an adaptive alignment system (e.g., system 202), may perform one or more processes in 400. The adaptive alignment system may align a boresight parameter. For example, the adaptive alignment system may determine a center of the image is relative to the IMU coordinate system.

In 410, the device may receive video data. In examples, the device may receive the video data from a camera (e.g., modular camera 240). In examples, the device may record a video and process the recorded video.

In 410, the device may receive pose data. For example, the device may receive the pose data from the IMU (e.g., IMU 220). The device may receive the video data and the pose data while the system is moved mostly in roll relative to the sensor being aligned. The roll direction relative to the sensor may be unknown and motion in other axes may be anticipated. The device may account off-axis motion(s) based on the indicated pose data. The device may tolerate and/or account for a motion in other axes. For example, the device may account for a larger motion, such as significant motion that is larger than a roll.

In 415, the device may crop one or more images associated with the video data. For example, the device may crop the images to an appropriate region of interest (ROI).

Figure 5:
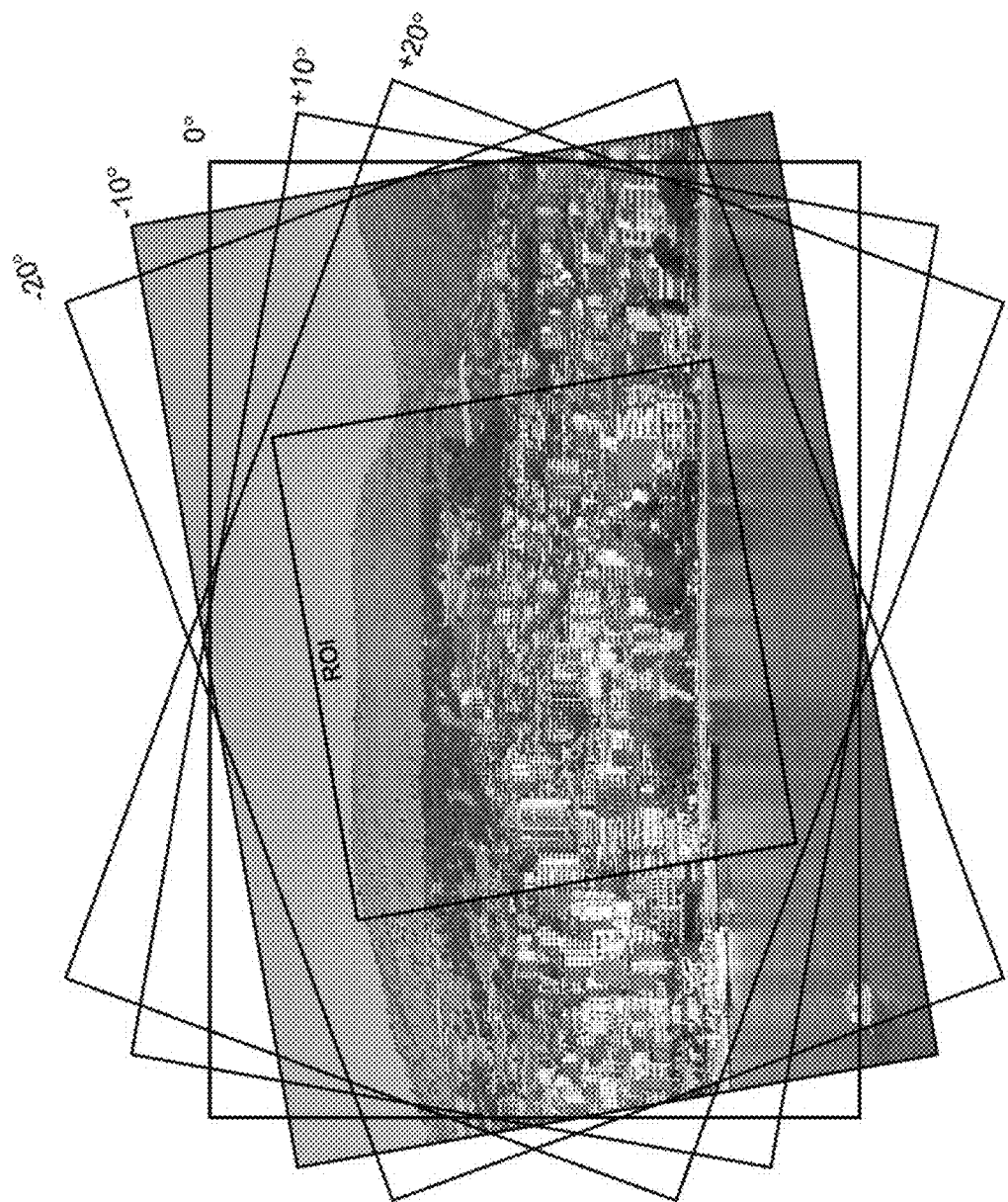
FIG. 5 illustrates an example search scene of line of sight (LOS) pixels according to an embodiment.

FIG. 5 illustrates an example ROI selected by a device, such as an adaptive alignment system. As illustrated in FIG. 5, the ROI is a part or a subset of the video image.

In 420, the device may select frames for registration. A frame may be a set of pixels. A frame may be a set of pixels that may be related to a sensor position, direction, and/or pose. The pose may be an indication of a direction that a sensor may be facing. In an example, the device may select two frames associated with the video data. The device may compare the two frames and may perform an alignment. The device may select sequential frames. For example, the device may select a first frame and may select a second frame. The second frame may happen right after the first frame. The second frame may be a few frames after the first frame. For example, the second frame may have occurred five frames after the first frame. The device may select the two frames for a registration. For example, the device may select the two frames for an initial registration.

In 425, the device may select a trial LOS pixel for possible center of rotation. The device may use the trial LOS pixel as an estimated center of rotation. For example, the device may use a search algorithm and may select the trial LOS pixel for an estimated center of rotation.

In 430, the device may register (e.g., re-register) sequential frames. For example, the device may re-register sequential frames based on the pose data centered at the trial LOS pixel. The re-registration may indicate a coordination between the image and the IMU based on the trial LOS pixel. For example, the device may use the trial LOS pixel and use an algorithm, such as a search algorithm, to search through different trial LOS pixels within the ROI of the image. As a way of an example, the device may use a search algorithm, such as OpenCV WarpImage( ) for re-registration. OpenCV WarpImage( ) may be or may include:

Matrix3×3 trans3×3=Nav2ImageTransform(transform);

cv::cuda::GpuMat transimage=WarpImage(im0_gpu, trans3×3,im0_gpu.size( );

In 435, the device may score one or more registered frames. A score may be an indicator of an accuracy of a parameter, such as an alignment parameter. A score may be determined by comparing one or more frames to determine an indicator of the alignment parameter accuracy. In an example, a comparison may be done by subtraction. In an example, a score could result from one or more calculations of the comparison such as an average and/or a standard deviation over one or more pixels when the one or more pixels are compared.

As described herein, a score may be provided. The score may be a standard deviation of the difference between pixels; a thresholding before or after comparing frames; an induced blur before or after comparing frames; a 2D Fourier Transform before or after comparing frames; an average, median, quartile analysis, or other statistical treatment before or after comparing frames; a fusion or separation of wavebands (e.g., colors) before or after comparing frames; a combination thereof; and/or the like.

In an example, the device may use the sum of the absolute value of the difference between pixels:

$$\text{Score}(I_n, I_{n-1}) = \sum_{row,col} \left\| I^n_{(r,c)} - I^{n-1}_{(r,c)} \right\|$$

The device may determine a better match. For example, the device may match the pixels from the two frames to determine how well the images match. As described herein, the device may use a search algorithm to determine scoring of the pixels of the first frame by comparing with the corresponding pixels of the second frame. In examples, the scoring with a low score (e.g., the lowest score) may indicate that the alignment associated with the low score may match (e.g., match the best) with the second frame. In examples, the scoring with the highest number may indicate that the alignment associated with the high score (e.g., highest score) may match (e.g., match the best) with the second frame. The alignment may be a pixel alignment, a latency alignment, a focal length alignment, a boresight alignment, a combination thereof, and/or the like. The device may determine that a low score indicates a better match if the device uses the sum of the absolute value of the difference between pixels.

In 440, the device may filter scored registered frames. For example, the device may sum (e.g., average) scores for one or more (e.g., all) registered frames, or otherwise reduce measurement noise. In an example, a sum and/or an average may be used to reduce measurement noise. In an example, one or more statistical methods may be used to reject and/or filter outliers. The one or more statistical methods may include filtering, curve fitting, and/or the like.

In 445, the device may select a different trial LOS pixel (e.g., a second trial LOS pixel). The device may repeat one or more processes (e.g., 430-440). For example, the device may perform re-registration with the second trial LOS pixel, score the registered frame based on the second trial LOS pixel, and/or sum the scored registered frame. The device may determine which trial LOS pixel matches with the images (e.g., based on the scoring).

As described herein, the device may use a search algorithm to determine scoring of the pixels of the first frame by comparing with the corresponding pixels of the second frame. In examples, the scoring with a low score (e.g., the lowest score) may indicate that the pixel associated with the low score may match (e.g., match the best) with the second frame. In examples, the scoring with the highest number may indicate that the pixel associated with the high score (e.g., highest score) may match (e.g., match the best) with the second frame. In examples, the device may use a range of ±10 pixels in each axis. The device may use a different range, e.g., depending on mechanical alignment tolerances of the system.

Figure 6:
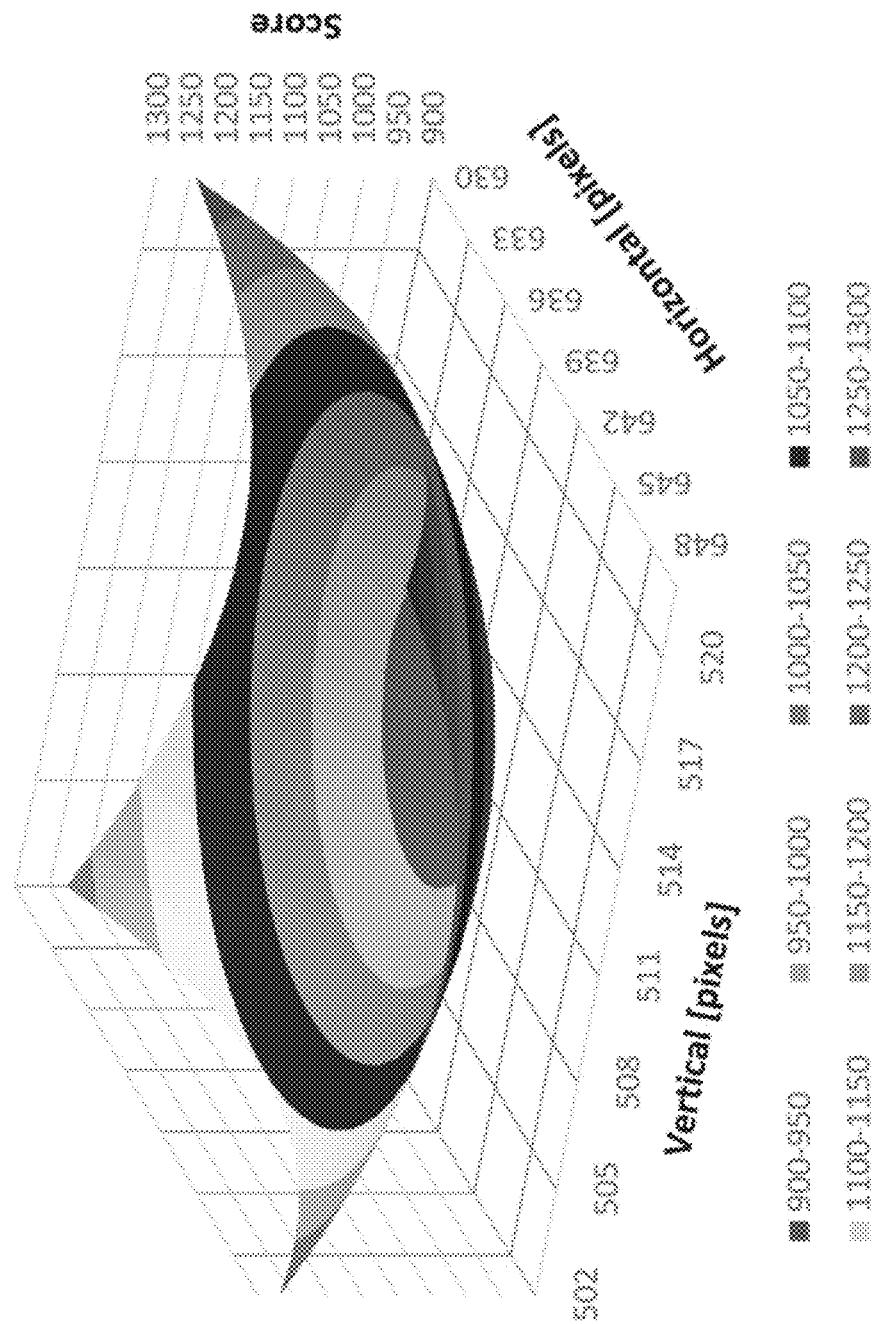
FIG. 6 illustrates an example search result for finding a X-Y boresight alignment according to an embodiment.

FIG. 6 illustrates an example search result for X-Y boresight alignment. As illustrated in FIG. 6, the lowest score X-Y boresight alignment may indicate the best X-Y boresight alignment to the IMU. As illustrated in FIG. 6, the adaptive alignment system may use a search grid. The search grid may use pixel positions 502 to 520 in the X direction and 630 to 650 in the Y direction. At each trial position, the adaptive alignment system may re-register frames, e.g., using that location for the boresight alignment in order to calculate a score. The calculated score may indicate the accuracy of the re-registration, e.g., for the corresponding trial position. The lowest score may indicate an optimum boresight alignment.

Figure 7:
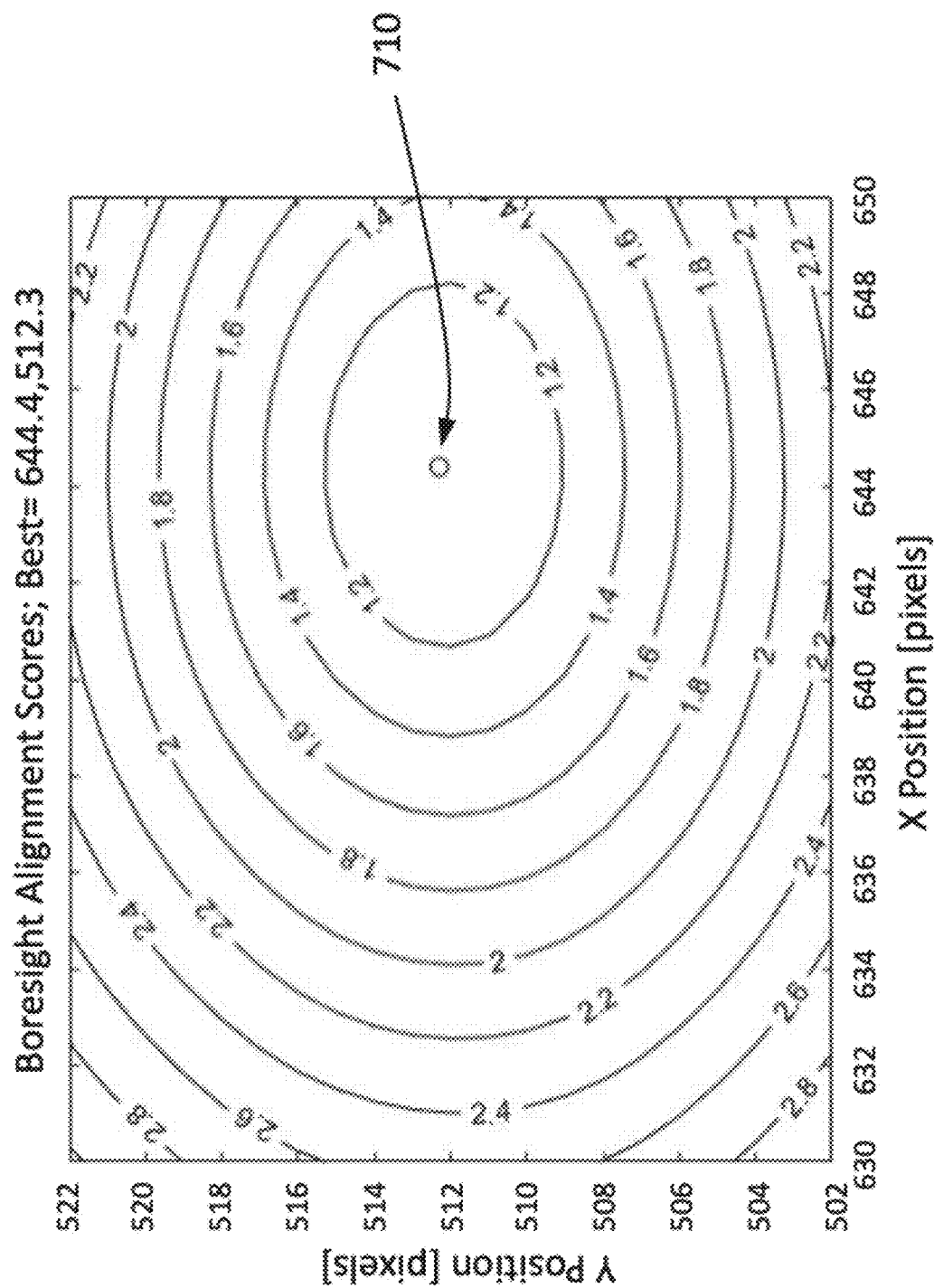
FIG. 7 illustrates an example 2-dimensional search for finding a X-Y boresight alignment according to an embodiment.

FIG. 7 illustrates an example 2-dimensional search used by an adaptive alignment system. For example, as described herein, the adaptive alignment system may find an X-Y boresight alignment. As illustrated in FIG. 7, a search grid may use pixel positions 630 to 650 in the X direction and 502 to 522 in the Y direction. At each trial position, the adaptive alignment system may re-register frames, e.g., using that location for the boresight alignment in order to calculate a score. The calculated score may indicate the accuracy of the re-registration, e.g., for the corresponding trial position. The lowest score may indicate an optimum boresight alignment. As illustrated in FIG. 7, the best alignment 710 may be at 644.4, 512.3. The relative scores may be annotated on the contour lines. The adaptive alignment system may use interpolation, e.g., to find a higher resolution alignment than the search grid.

The adaptive alignment system may align one or more parameters, such as a latency parameter (e.g., time coordination between an image and pose data), a sensor focal length parameter, an image rotation parameter (e.g., an alignment of image vertical pixels to IMU vertical plane), an image boresight parameter (e.g., alignment of image horizontal and vertical offset to agree with an IMU pointing reference), or a distortion parameter (e.g., variation of effective focal length across the sensor field of view). The adaptive alignment system may refine one or more parameters, e.g., to improve the accuracy, repeatability, speed, and/or to characterize performance for a variety of scene conditions. The adaptive alignment system may utilize frame re-registration and scoring process as described herein.

In an example, the adaptive alignment system may provide an alignment parameter. The alignment petameter may be a value that may be used in one or more calculations that may determine the location of origin of a signal observed by a sensor. In an example, the alignment parameter may adjust a latency between a pose detector and a sensor. In an example, the alignment parameter may adjust the focal length and/or a magnification of a sensor. In an example, the alignment parameter may adjust a boresight between a pose detector and a sensor in one or more directions, such as a horizontal direction, a vertical direction, and/or a roll. In an example, the alignment parameter may adjust a distortion of a sensor, such as mapping one or more pixel observation directions relative to a boresight location.

The adaptive alignment system may align a latency parameter (e.g., associated with the sensor to the IMU latency). For example, a frame timestamp and a pose data timestamp may differ, e.g., on the order of 15 ms. Variable angular velocity slew of a scene may provide adequate frame to frame re-registration scores, e.g., to calibrate the latency. For example, even if the IMU to sensor co-boresight is not calibrated, variable angular velocity slew of a scene may provide adequate frame to frame re-registration scores. The adaptive alignment system may perform (e.g., perform first) calibration for latency and may refine the calibration for the latency after the other calibrations are complete.

In an example, latency may be ambiguous when an angular velocity may be constant. A change (e.g., any change) in velocity, such as back and forth, a change in a slew direction, an acceleration, and/or the like may enable latency optimization (e.g., may enable a unique latency optimization). A change in velocity may enable latency optimization, for example, when the motion pattern and/or frame rate may not create an aliasing effect.

In addition to and/or alternative to selecting a trial LOS pixel, the adaptive alignment system may select the trial LOS pixel in terms of time. For example, the adaptive alignment system may perform a re-registration for time coordination between the two frames and perform scoring to find a matched (e.g., the best matched) frame to the image.

The adaptive alignment system may align a sensor focal length parameter. This may be done, for example, to address distortions that may be related to focal length, such as a difference between expected magnification and actual magnification. Given a focal plane geometry of number of pixels and pixel pitch, an angular change across N pixels of scene motion stimulus may enable calculation of a focal length (e.g., an effective focal length). The scene motion may be a pattern, e.g., a pattern that moves the scene. Random motion may have been used. The adaptive alignment system may find optimum motion profiles. For example, the adaptive alignment system may determine the optimum motion profiles, e.g., near the center of the LOS where distortion effects are minimum. Since distortion effects can be expressed as an offset from an ideal focal length, the adaptive alignment system may choose an arbitrary focal length or use a factory determined value. The adaptive alignment system may express one or more (e.g., all) variations as distortion offsets from that chosen focal length.

The adaptive alignment system may adjust IMU to sensor LOS co-boresight and/or rotation parameters. The adaptive alignment system may apply the process described herein and use a yaw axis (e.g., instead of using the roll axis for the motion stimulus) and provide the largest number of useful scene pixels in the horizontal direction for the re-registration matching processing. The yaw axis may identify an image rotation (e.g., roll) relative to the IMU coordinate system.

The adaptive alignment system may adjust IMU to sensor LOS co-boresight, horizontal and/or vertical parameter as described herein.

The adaptive alignment system may align a sensor distortion parameter. Focal length and distortion may be interdependent metrics. For example, the adaptive alignment system may use the focal length and the distortion to determine pixel positions relative to the LOS boresight. The adaptive alignment system may select smaller regions of the image (e.g., in comparison to the regions of the image for the focal length alignment).

The adaptive alignment system may choose one or more different parameters, e.g., to separate the focal length and the distortion components. The adaptive alignment system may combine the focal length and the distortion components into equivalent corrections for individual pixel positions. Distortion characterization may utilize the focal length process as described herein, e.g., on small subsets of the image at a variety of field positions. The variation in effective focal length versus field position may be transformed into a conventional distortion prescription.

Figure 8:
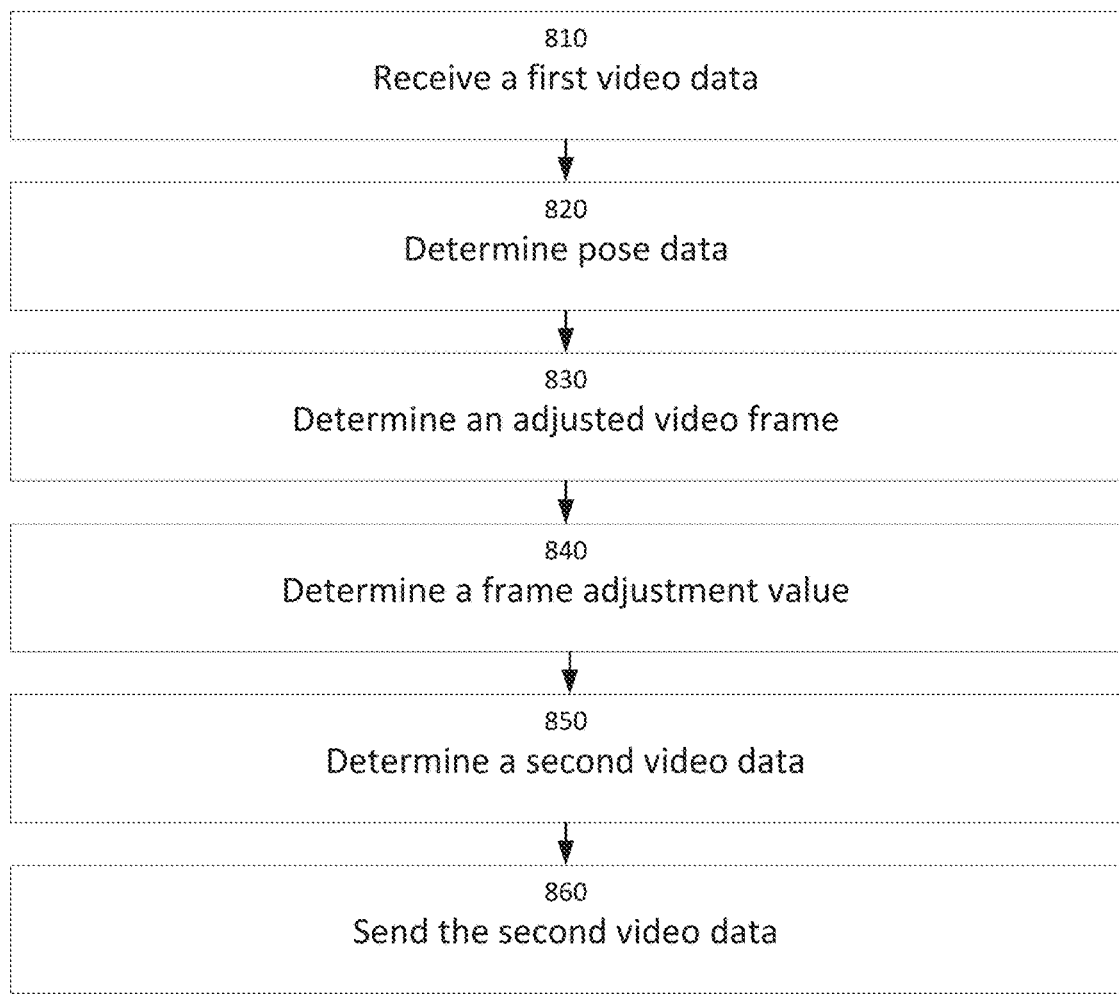
FIG. 8 illustrates an example device performing adaptive alignment on an alignment parameter.

FIG. 8 illustrates an example device performing adaptive alignment on an alignment parameter. A device (e.g., device 102) and/or an adaptive alignment system (e.g., system 202), may perform process 800.

In 810, a device (e.g., device 102) and/or an adaptive alignment system (e.g., system 202), may receive a video data. For example, the adaptive alignment system may receive video data from the camera, e.g., mounted camera. The video data may be or may include one or more frames. The adaptive alignment system may process the video data. For example, the adaptive alignment system may process a first frame and a second frame associated with the video data.

The video data described herein may be a part of a sensor data that the device receives. For example, the device may receive a sensor data, and the sensor data may include video data. The device may receive at least a video data, a light detection and ranging data (LIDAR), an infrared camera data, or a sonar data. The device may receive a signal, such as any of the signals described herein.

In 820, the device may determine pose data. The pose data may be associated with the first video frame and the second video frame. In examples, the device may receive the pose data from an IMU (e.g., IMU 220). The pose data may indicate a motion for the video data.

In 830, the device may determine an adjusted frame. The device may select a frame (e.g., a first video frame) associated with the video data. For example, the device may determine an adjusted frame based on the first video frame and a motion indicated by the pose data. The device may determine, that based on the motion indicated by the pose data, an alignment between the first video frame and the pose data may be improved. The device may improve the alignment between the first video frame and the pose data by adjusting the first video frame to compensate for at least a latency between the first video data and the pose data, a focal length of a sensor associated with the first video data, a distortion caused by the sensor associated with the first video data, a rotation of the sensor associated with the first video data, a vertical movement of the sensor associated with the first video data, or a horizontal movement of the sensor associated with the first video data.

In 840, the device may determine a frame adjustment value by comparing a first pixel from the adjusted video frame to a second pixel from the second video frame. The frame adjustment value may correlate the pose data to the first video data. For example, the device may determine a region of interest (ROI) associated with the first frame of the video data. The device may select a pixel from the first frame (e.g., a trial pixel or a first pixel). The pixel may be located in the ROI of the first frame. The device may determine how well the pixel matches with a corresponding pixel (e.g., a second pixel) from the second video frame.

In 850, the device may determine a second video data by applying the frame adjustment value to the first video data if the frame adjustment value satisfies criteria. In examples, if the frame adjustment value indicates an improved alignment between the pose data and the second video data when the first frame adjustment value is compared to a second frame adjustment value, the device may determine that the first frame adjustment value has been satisfied. In examples, if the frame adjustment value is within a tolerance range, the device may determine that the first frame adjustment value has been satisfied. The device may score the frame adjustment value using, for example, a difference between the first pixel and the second pixel.

In 860, the device may send the second video. The second video may indicate that the video frame has been aligned to incorporate motion determined by the pose data.

The motion indicated by the pose data may be a roll motion. The device may determine the frame adjustment value by comparing the first pixel from the adjusted video frame to the second pixel from the second video frame. The device may determine the first pixel from the adjusted video frame. The first pixel may indicate an estimation of a center of the adjusted video frame. The device may determine the second pixel from the second video frame. The second pixel may indicate an estimation of a center of the second video frame. The device may generate a score based on a difference between the first pixel and the second pixel.

The roll described herein may indicate how the IMU sees the system moving in one direction. For example, the roll may indicate a motion of a platform, such as a ship. The rotation described herein may indicate the rotation of the mounted camera(s) relative to the IMU. For example, the rotation may indicate a movement of the camera relative to the IMU.

In examples, the device may align a latency parameter. As described herein, the device may select two frames associated with a video data. The latency parameter may be or may be associated with a frame period, a frame rate, a time between two frames, and/or a pose data rate. The adaptive alignment system may perform scoring based on pixels located in the ROI of the first frame and comparing the pixels to the corresponding pixels in the second frame. The device system may find a pixel that matches (e.g., matches the best) with the corresponding pixel from the second frame. In examples, the device may perform the scoring by subtracting the two pixels. In examples, the device may perform the scoring by performing a standard deviation.

The device may match the pixels from the two frames to determine how well the images match. As described herein, the device may use a search algorithm to determine scoring of the pixels of the first frame by comparing with the corresponding pixels of the second frame. In examples, the scoring with a low score (e.g., the lowest score) may indicate that the pixel associated with the low score may match (e.g., match the best) with the second frame. In examples, the scoring with the highest number may indicate that the pixel associated with the high score (e.g., highest score) may match (e.g., match the best) with the second frame.

The device may determine a pattern associated with one or more parameter alignment. For example, the device system may determine that for a focal length scoring, the scoring may have a parabola pattern. By using the parabola, the device may use a curve fit to the different scores and determine the best position for focal length.

The device may select the lowest score from the search and may change a resolution of the search. The device may align by performing search and scoring process described herein for one or more (e.g., all) five alignment parameters.

The adaptive alignment system may include an IMU. The IMU may provide information, e.g., to the adaptive alignment system, where the camera is pointing. The IMU may be positioned close to the camera. For example, the IMU may be mounted close to the camera and may determine information (e.g., motion, roll, etc.) related to the camera.

The adaptive alignment system may include an inertial navigation system. The adaptive alignment system may receive data from an inertial navigation system (e.g., external to the adaptive alignment system). The inertial navigation system may provide inertial information. For example, the adaptive alignment system may determine the earth turning, where the camera is pointing, how the camera moved based on data from the inertial navigation system The adaptive alignment system may use an alignment, such as a depth alignment, and may determine pixels where the IMU is mounted. For example, the adaptive alignment system may use the depth alignment and determine a coordinate system, such as an IMU coordinate system. The adaptive alignment system may know a magnification associated with a pixel in the IMU coordinate system.

The adaptive alignment system may use an inertial navigation system and may map the IMU coordinate system to a coordinate, such as a geospatial coordinate. For example, the inertial navigation system may use the pose data to map the IMU coordinate to a geospatial coordinate. The inertial navigation system may use other coordinate, e.g., a coordinate relative to a coordinate of a platform (e.g., ship, or etc.)

The adaptive alignment system may have multiple cameras. The adaptive alignment system may have a wider field of view by using the multiple cameras. Each camera may be positioned in one direction and may provide a wide field of view to the system. The adaptive alignment system may stitch images from the multiple cameras into one image. The stitched image may overlap and may provide an image with a wide view. For example, the adaptive alignment system may stich one or more images from the multiple cameras and may create a panoramic picture.

The adaptive alignment system may be used together with a moving target detector system. For example, a ship moving through the water may have a moving target detector system. A camera in the ship may see whitecaps and the moving target detector system may determine that the scene is moving. The moving target detector system may utilize the adaptive alignment system and exclude those pixels that are considered moving (e.g., the whitecaps). The adaptive alignment system may isolate and detect a non-moving pixel (e.g., a target in the water). In an example, a determination may be made between moving pixels and non-moving pixels. In an example, the non-moving pixels may be used for an adaptive alignment measurement, it may be more efficient to use the non-moving pixels in place of the moving pixels.

A method and/or system for an adaptive alignment may be provided. In an example, a density of search points near a minimum score may be increased using a coarse search method and/or a fine search method. Since correction of a measurement parameter (e.g., each measurement parameter) may influence the other measurements, a sequence of iterations (e.g., the best sequency of iterations) may be determined. It may be determined when sufficient iterations have been performed. In an example, repeated measurements may enable a rejection of outliers. In an example, averaging may be used to reduce measurement noise.

In an example, a frame separation may be chosen as a function of scene velocity to approximate a number (e.g., a standard number) of pixel offsets between compared frames. For scenes with regions of motion that may be uncorrelated to the IMU, a compromise may be used as a slightly smaller frame separation may provide more accurate results.

In an example, such as when adjusting for a boresight axis (e.g., boresight X,Y), perimeter pixels may be emphasized to improve a signal to noise ratio (SNR). For example, pixels may be masked out in the center to emphasize the perimeter pixels.

In an example, such as when adjusting for distortion, portions of the available scene may be used. For example, when portions of the scene are available for making distortion measurements, the scene may be panned across to place suitable scene features at a distortion measurement grid point (e.g., each distortion measurement grid point).

In an example, such as when adjusting for distortion, two-dimensional smoothing may be used. For example, two-dimensional smoothing of a grid of distortion measurements may be used.

In an example, changes in velocity (e.g., changes in X, Y velocity) may be used. A controlled motion profile may improve the SNR. For example, a circular pattern or a box pattern may improve SNR.

In an example, image re-registration may use a process, such as f*TAN(theta), which may be used with or without consideration of distortion effects. For example, using f*theta may improve accuracy for a lens with lower distortion relative to f*theta. In an example, images may be corrected for distortion prior to re-registration comparison, which might improve SNR.

In an example, image processing may be used to qualify suitable regions of the scene for contrast, spatial frequency content, and/or an absence of moving features uncorrelated to IMU motion.

In an example, measurement uncertainty may be established as a function of scene contrast, spatial frequency content, absence of moving features, number of pixels used, frame rate, AA search shape and variability, score shape, score variability, a combination thereof, and/or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a device, a wireless transmit/receive unit, user equipment, terminal, base station, RNC, or any host computer.

What is claimed:
1. A device for providing an adaptative alignment, the device comprising:
a processor configured to:
receive first video data, wherein the first video data comprises a first video frame and a second video frame;
determine pose data, wherein the pose data is associated with the first video frame and the second video frame;
determine an adjusted video frame based on the first video frame, a motion indicated by the pose data, and a frame adjustment value;
determine a frame adjustment score by comparing a first pixel from the adjusted video frame to a second pixel from the second video frame, wherein the frame adjustment score indicates an alignment accuracy of the pose data relative to the first video data;
determine second video data by applying the frame adjustment value to the first video data if the frame adjustment score satisfies a criteria; and
send the second video data.

2. The device of claim 1, wherein the pose data indicates at least one of an attitude of a sensor or a position of the sensor.

3. The device of claim 1, wherein the processor is configured to:
determine the adjusted video frame based on the first video frame, the motion indicated by the pose data, and the frame adjustment value by determining, based on the motion, that an alignment between the first video frame and the pose data can be improved by adjusting the first video frame to compensate for at least a latency between the first video data and the pose data, a focal length of a sensor, a distortion caused by the sensor, a rotation of the sensor, a vertical movement of the sensor, a horizontal movement of the sensor, or an attitude of the sensor.

4. The device of claim 1, wherein the frame adjustment score is a first frame adjustment score, and wherein the first frame adjustment score satisfies the criteria if the first frame adjustment score indicates an improved alignment between the pose data and the first video data when the first frame adjustment score is compared to a second frame adjustment score.

5. The device of claim 1, wherein the frame adjustment score satisfies the criteria if the frame adjustment score is within a tolerance range.

6. The device of claim 1, wherein the motion includes a roll motion component, and wherein the processor being configured to determine the frame adjustment score by comparing the first pixel from the adjusted video frame to the second pixel from the second video frame comprises the processor being configured to by:
determine the first pixel from the adjusted video frame, wherein the first pixel indicates an estimation of a center of the adjusted video frame;
determine the second pixel from the second video frame, wherein the second pixel indicates an estimation of a center of the second video frame; and
determine the frame adjustment score based on a difference between the first pixel and the second pixel.

7. The device of claim 1, wherein the processor is further configured to:
determine a region of interest (ROI) associated with the first video frame and the second video frame; and
determine the first pixel from an area of the adjusted video frame, wherein the area correlates to the ROI.

8. A method performed by a device for providing an adaptive alignment, the method comprising:
  receiving first video data, wherein the first video data comprises a first video frame and a second video frame;
  determining pose data, wherein the pose data is associated with the first video frame and the second video frame;
  determining an adjusted video frame based on the first video frame, a motion indicated by the pose data, and a frame adjustment value;
  determining a region of interest (ROI) associated with the first video frame and the second video frame;
  determining a frame adjustment score by comparing a first pixel from an area of the adjusted video frame to a second pixel from the second video frame, wherein the area of the adjusted video frame correlates to the ROI, and wherein the frame adjustment score indicates an alignment accuracy of the pose data relative to the first video data;
  determining second video data by applying the frame adjustment value to the first video data if the frame adjustment score satisfies a criteria; and
  sending the second video data.

9. The method of claim 8, wherein the pose data indicates at least one of an attitude of a sensor or a position of the sensor.

10. The method of claim 8, wherein determining the adjusted video frame based on the first video frame, the motion indicated by the pose data, and the frame adjustment value comprises:
  determining, based on the motion, that an alignment between the first video frame and the pose data can be improved by adjusting the first video frame to compensate for at least a latency between the first video data and the pose data, a focal length of a sensor, a distortion caused by the sensor, a rotation of the sensor, a vertical movement of the sensor, a horizontal movement of the sensor, or an attitude of the sensor.

11. The method of claim 8, wherein the frame adjustment score is a first frame adjustment score, and wherein the first frame adjustment score satisfies the criteria if the first frame adjustment score indicates an improved alignment between the pose data and the second video data when the first frame adjustment score is compared to a second frame adjustment score.

12. The method of claim 8, wherein the frame adjustment score satisfies the criteria if the frame adjustment score is within a tolerance range.

13. The method of claim 8, wherein the motion includes a roll motion component, and wherein determining the frame adjustment score by comparing the first pixel from the area of the adjusted video frame to the second pixel from the second video frame comprises:
  determining the first pixel from the adjusted video frame, wherein the first pixel indicates an estimation of a center of the adjusted video frame;
  determining the second pixel from the second video frame, wherein the second pixel indicates an estimation of a center of the second video frame; and
  determining the frame adjustment score based on a difference between the first pixel and the second pixel.

14. The method of claim 8, wherein determining the adjusted video frame based on the first video frame and the motion indicated by the pose data further comprises determining the adjusted video frame based on the first video frame, the motion indicated by the pose data, and a focal length of a sensor associated with the first video data.

15. The method of claim 8, wherein determining the adjusted video frame based on the first video frame and the motion indicated by the pose data further comprises:
  determining a time difference between a first timestamp associated with the first video frame and a second timestamp associated with the pose data; and
  determining the adjusted video frame based on the first video frame, the motion indicated by the pose data, and the time difference.

* * * * *